US005476258A

United States Patent [19]
Frisone

[11] Patent Number: 5,476,258
[45] Date of Patent: Dec. 19, 1995

[54] GOLF BALL POSITION MARKER WITH SLOPE INDICATOR

[76] Inventor: Daniel Frisone, 25 Van Buren Ave., Cuyahoga Falls, Ohio 44221

[21] Appl. No.: 391,953

[22] Filed: Feb. 21, 1995

[51] Int. Cl.⁶ ............................................. A63B 57/00
[52] U.S. Cl. .......................................... 273/32 A; 33/377
[58] Field of Search ............................ 273/32 A, 32 R, 273/32 B, 32 H, 162 B, 162 D; 33/365, 377

[56] References Cited

U.S. PATENT DOCUMENTS

| | | | |
|---|---|---|---|
| D. 233,897 | 12/1974 | Hart | D21/2 |
| D. 319,862 | 9/1991 | Lahger | D21/234 |
| 559,090 | 4/1896 | West | 33/365 |
| 1,361,367 | 12/1920 | Coxey | 33/365 X |
| 1,716,261 | 6/1929 | Davis | 273/162 |
| 2,919,922 | 1/1960 | Skelly | 273/163 |
| 2,995,375 | 8/1961 | Bukovey | 273/162 B |
| 3,041,071 | 6/1962 | Fialon | 273/32 A |
| 3,136,547 | 6/1964 | Schaper | 273/32 A |
| 3,622,157 | 11/1971 | Hatch | 273/32 A |
| 3,751,819 | 8/1973 | Dixon | 33/389 |
| 3,895,797 | 7/1975 | Moore | 273/32 A |
| 4,130,950 | 12/1978 | Bazzle et al. | 36/127 |
| 4,521,018 | 6/1985 | Cotchonis | 273/32 A |
| 4,822,052 | 4/1989 | Dimmick et al. | 273/162 D |
| 4,824,114 | 4/1989 | Catalano | 273/162 B |
| 4,854,047 | 8/1989 | Conanan | 33/377 |
| 5,157,842 | 10/1992 | Swanda | 33/365 |
| 5,174,572 | 12/1992 | Ho | 273/162 B |

FOREIGN PATENT DOCUMENTS 549720A 3/1993 Japan ........................ 273/32

Primary Examiner—William H. Grieb
Attorney, Agent, or Firm—David A. Burge

[57] ABSTRACT

A golf ball position marker has a thin, circular body that is sufficiently transparent to permit viewing 1) of a body-defined, disc-shaped, oil-filled chamber, 2) of body-carried indicia located adjacent the chamber, and 3) of a steel ball that is movably housed within the chamber and that cooperates with the indicia to provide an indication of the slope and break of a portion of a golf green on which the marker is placed. The movable ball and the indicia cooperate 1) to indicate that a portion of a golf green on which the marker is positioned is "level" if the ball remains centered within the chamber, 2) to indicate the direction of slope of an inclined green by the direction in which gravity causes the ball to move from the center of the chamber when the marker is placed on an inclined green, and 3) to indicate steepness of slope of an inclined green by the speed with which the ball moves from the center to one side of the chamber when the marker is placed on an inclined green. The oil is selected to have a viscosity that will cause the ball to move relatively slowly from the center to one side of the chamber when the marker is placed on a gently inclined green, with more rapid movement of the ball being permitted when the marker is placed on a more steeply inclined green.

20 Claims, 3 Drawing Sheets

GOLF BALL POSITION MARKER WITH SLOPE INDICATOR

BACKGROUND OF THE INVENTION

1. Field of the Invention

The present invention relates to a golf ball position marker having a relatively thin, generally circular body that is at least partially transparent to permit viewing 1) of a body-defined, disc-shaped, oil-filled chamber, 2) of body-carried indicia located adjacent the chamber, and 3) of a Steel ball that is movably housed within the chamber and that cooperates with the indicia to provide an indication of the slope and break of a portion of a golf green on which the marker is placed. More particularly, the invention relates to a golf ball position marker having a disc shaped body into which are incorporated a modified form of "bull's-eye level" together with a novel arrangement of useful indicia that cooperate 1) to indicate that a portion of a golf green on which the marker is positioned is "level" if the ball remains centered within the chamber, 2) to indicate the direction of slope of an inclined green by the direction in which gravity causes the ball to move from the center of the chamber when the marker is placed on an inclined green, and 3) to indicate the steepness of slope of an inclined green by the speed with which the ball moves from the center to one side of the chamber when the marker is placed on an inclined green, with relatively slow ball movement being indicative of a gentle slope, and with relatively fast ball movement being indicative of a relatively steep slope.

2. Prior Art

Removal of a golf ball from the surface of a golf green is permitted by the rules of the game of golf so that the ball can be cleaned, and to ensure that a golf ball of one player does not obstruct the putt of another player. However, the position of a ball that is lifted from the surface of a green must be marked to ensure that, when the ball is replaced, it will be returned to the same spot from which it was lifted.

Rules governing the use of a ball position marker call for it normally to be placed immediately behind the position of a lifted ball. However, if the normal positioning of a ball marker should interfere with the play, stance or stroke of another golfer, the rules call for the marker to be placed one or more putter head lengths to one side.

To accommodate the marking of the position of golf balls, it is common for golfers to carry on their person or in a compartment of their golf bags, one or more ball position markers. The most accepted configuration for a golf ball position marker is a thin, circular, disc shape—much like that of a coin. Indeed, some golfers prefer to use a coin as a ball position marker.

A need that has not been addressed by prior golf ball position marker proposals is that of incorporating into a golf ball position marker, without unduly increasing the size, weight and expense of the marker, a suitable mechanism together with a suitable arrangement of indicia for providing meaningful assistance to a golfer in evaluating the slope and break of a portion of a green on which a marker is placed.

While a variety of golf related devices other than golf ball position markers have been proposed that incorporate some form of device for indicating the slope of a golf green, no proposal has been forthcoming, until now, for an indicator that will function in a variety of modes to provide helpful slope and break data, and that is sufficiently simple, compact, and inexpensive design to permit its being incorporated in a practical way into a golf ball position marker.

SUMMARY OF THE INVENTION

The present invention addresses the foregoing and other needs, drawbacks and shortcomings of the prior art by providing a golf ball position marker has a relatively thin, generally circular body that is at least partially transparent to permit viewing 1) of a body-defined, disc-shaped, oil-filled chamber, 2) of body-carried indicia located adjacent the chamber, and 3) of a steel ball that is movably housed within the chamber and that cooperates with the indicia to provide an indication of the slope and break of a portion of a golf green on which the marker is placed.

In essence, what the present invention provides is a golf ball position marker having a disc shaped body into which are incorporated a modified form of "bull's-eye level" together with a novel arrangement of useful indicia that cooperate 1) to indicate that a portion of a golf green on which the marker is positioned is "level" if the ball remains centered within the chamber, 2) to indicate the direction of slope of an inclined green by the direction in which gravity causes the ball to move from the center of the chamber when the marker is placed on an inclined green, and 3) to indicate the steepness of slope of an inclined green by the speed with which the ball moves from the center to one side of the chamber when the marker is placed on an inclined green, with relatively slow ball movement being indicative of a gentle slope, and with relatively fast ball movement being indicative of a relatively steep slope.

One feature of the preferred practice of the present invention resides in the use it makes of a novel and improved arrangement of indicia that is incorporated together with a movable indicator into a disc shaped body of a golf ball position marker to provide a clear indication not only of the actual direction of maximum slope of a portion of green on which the marker is placed, but also to provide a definite statement that can register with ease in the golfer's mind as to whether the green breaks to the right or to the left.

Another feature of the preferred practice of the present invention is the use that is made of a cleverly modified form of a so-called "bull's-eye level" to substitute for the usual "bubble" and curved-top chamber a simple steel ball and flat-top chamber that not only serve to keep down the cost of the resulting device but also permit the device to provide more information more clearly than would be the case than would result if a more costly, more conventional "bubble" and curved-top chamber were used. So called "bubble" levels tend to be operable with only limited ranges of surface inclinations. By substituting a steel ball that is movable within a chamber that is filled with oil of carefully chosen viscosity, the present invention provides a slope indicator that not only gives a reading of direction of slope, but that also can be used to provide an indication of the steepness of slope by virtue of observing the speed with which the ball moves from the center to the side of the chamber as the golf ball position marker is placed on a green.

Still other features of the invention reside in the character and arrangement of the "indicia" that is provided for cooperating with the chamber-housed ball for assisting to formulate in the mind of the golfer a clear statement of the character of the green that needs to be taken into account. In preferred practice the provided indicia include:

1) first and second perpendicular lines that each extend at least part way across the circular chamber and that cooperate to divide the circular chamber into four equal quadrants that include a "Left Down" quadrant, a "Right Down" quadrant, a "Left Up" quadrant, and a "Right Up" quadrant, with an arrow being provided at one end of the first line at the juncture of the "Left Down" and the "Right Down" quadrants;

2) a center circle mark located in close proximity to and surrounding the center of the circular chamber;

3) The word "Down" placed so as to be associated with the "Left Down" and the "Right Down" quadrants;

4) The word "Up" placed so as to be associated with the "Left Up" and the "Right Up" quadrants;

5) The word "Left" placed so as to be associated with the "Left Down" and the "Left Up" quadrants; and, 6) The word "Right" placed so as to be associated with the "Right Down" and the "Right Up" quadrants.

The preferred technique for using the marker is to lower it into a ball marking position while holding the marker substantially "level" with the ball substantially centered in the "center circle" (i.e., with the ball in the center of the oil-filled chamber). Once any portion of the marker engages the green, the marker is released so that it can drop into place on the green, and movement of the ball in the chamber is observed to note whether the ball moves from the center to one side of the chamber slowly (indicating a gentle green slope), or rapidly (indicating a more substantial green slope). Once the ball has come to rest at one side of the chamber, an observation is made as to whether the ball is in the "Left Down," "Right Down," "Left Up" or "Right Up" quadrants—to indicate whether the green breaks "Down and to the Left," "Down and to the Right," "Up and to the Left" or "Up and to the Right," respectively. Making these observations by using the marker in the manner just described helps to register important information in the mind of the golfer—information that needs to be taken carefully into account in putting so that the ball can be putted skillfully, using a minimum number of strokes, toward and into the hole of the green.

An alternative embodiment of the marker is described that incorporates a convex top surface that will cause one's view of the ball and the indicia to be magnified—thereby adapting the marker for use by at least some visually impaired persons.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF THE PREFERRED EMBODIMENT

Figure 1:
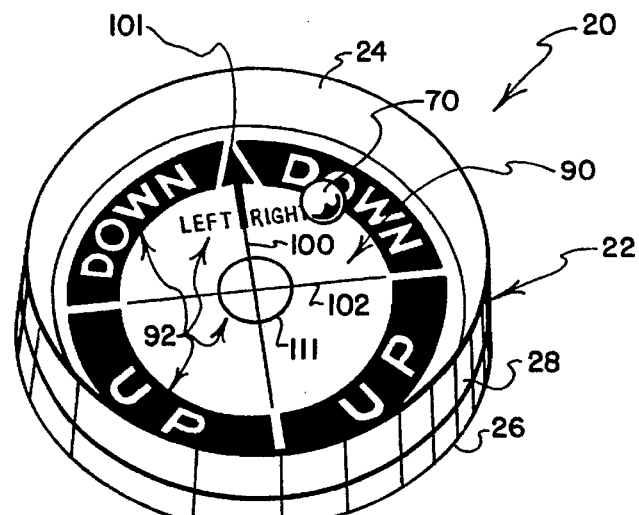
FIG. 1 is a perspective view of a golf ball position marker that embodies features of the preferred practice of the present invention, with a movable ball of the marker cooperating with indicia of the marker to indicate a golf green slope that is "down" and "right;"
Figure 2:
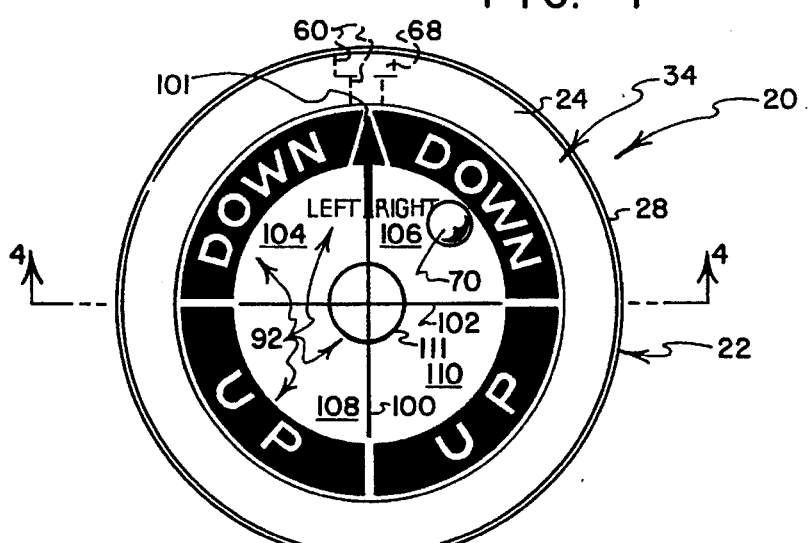
FIG. 2 is a top plan view thereof.
Figure 3:
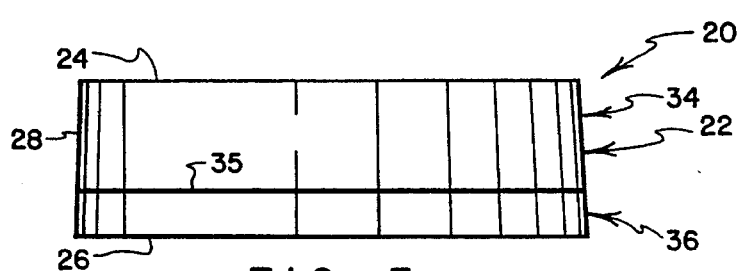
FIG. 3 is a front elevational view thereof.

Referring to FIGS. 1–3, a golf ball position marker that embodies features of the preferred practice of the present invention is indicated generally by the numeral 20. The marker 20 has a substantially transparent body 22 that is generally of disc shape, featuring a substantially flat, circular top surface 24 and a substantially flat, circular bottom surface 26. The top and bottom surfaces 24, 26 extend in spaced, parallel planes, and have their circumferences connected by a side surface 28.

While the top and bottom surfaces 24, 26 are clear (thereby permitting a view through the surfaces 24, 26 into the transparent body 20), the side surface 28 is roughened or chemically treated to render it opaque. In preferred practice, the side surface 28 has a slightly roughened, uniformly "cloudy" appearance and is of frusto-conical shape—which provides an easy-to-grasp surface that facilitates moving the marker 20 from place to place.

Figure 4:
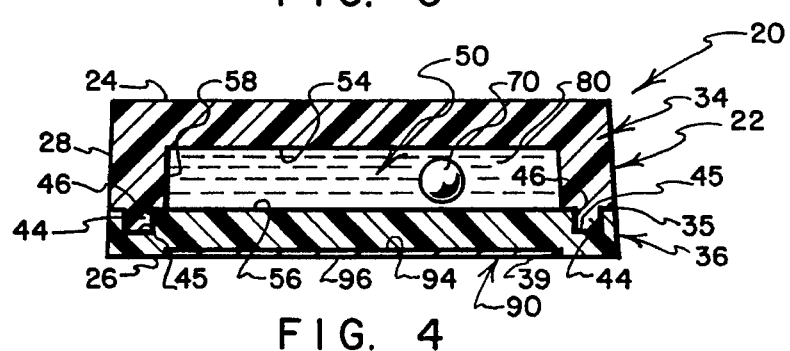
FIG. 4 is a sectional view as seen from a plane indicated by a line 4—4 in FIG. 2.

Before turning to a more detailed description of the golf ball position marker 20, a brief overview of its components and construction will be provided. Referring to FIG. 4 wherein the body 22 is shown in cross section, it will be seen that the body 22 is formed as an assembly of an upper member 34 and a lower member 36, with an annular depending formation 44 of the upper member 34 extending into an annular upwardly-opening groove 46 of the lower member 36. A bond, indicated by the numeral 45, is formed between the depending formation 44 and portions of the lower member 36 that define the groove 46.

Figure 6:
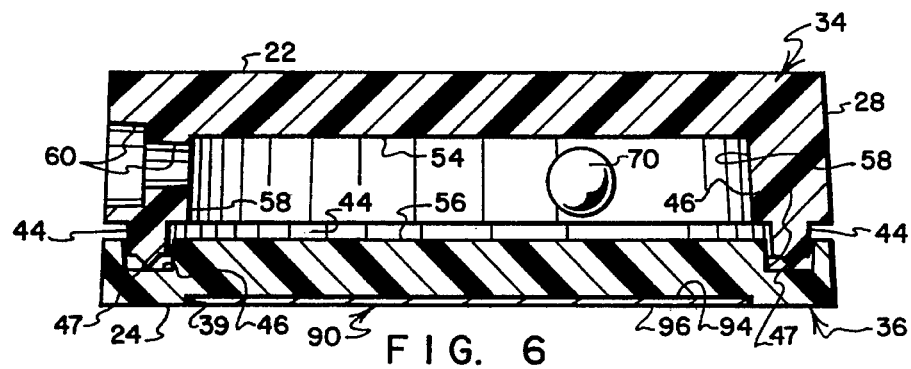
FIG. 6 is a sectional view similar to FIG. 5 but showing components of the marker in an early stage of assembly.
Figure 7:
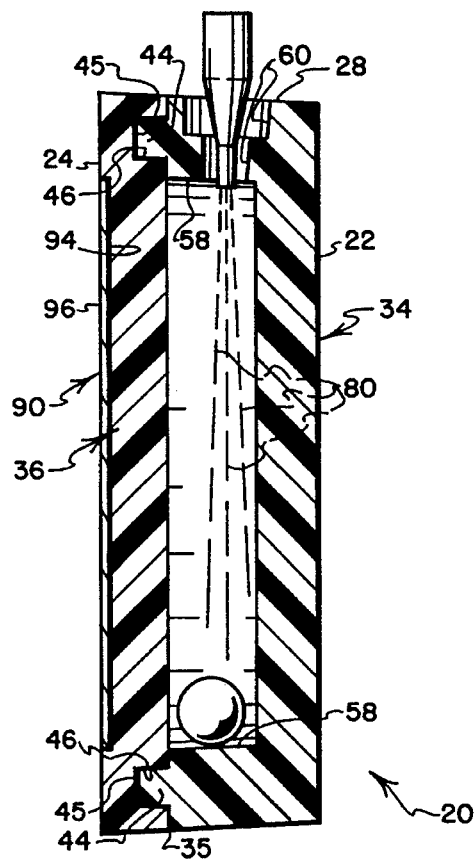
FIG. 7 is a sectional view similar to FIGS. 5 and 6 but showing the components of the marker in a later stage of assembly.

The upper and lower members 34, 36 have interior portions that cooperate to define a chamber 50 within the interior of the body 22. Spaced, overlying surfaces 54, 56 of the upper and lower members 34, 36, respectively, define parallel-extending top and bottom walls of the chamber 50. An annular surface 58 of the upper member 34 extends circumferentially about the periphery of the chamber 50. The interior annular surface 58 is spaced inwardly from the exterior side surface 28 and has an inclination and frusto-conical configuration that corresponds to that of the side surface 28 so that, as viewed in cross-section in FIG. 4, the surfaces 28, 58 are seen to extend in parallel planes. A "fill passage" 60 (see FIG. 2 and FIGS. 5–7) is defined by the upper member 34 and opens through the surfaces 28, 58 for permitting oil 80 to be introduced into the chamber 50 in a manner that is illustrated in FIG. 7. As is best seen in FIG. 8, when assembly of the marker 20 has been completed, a "plug" 68 closes the fill passage 60.

Figure 5:
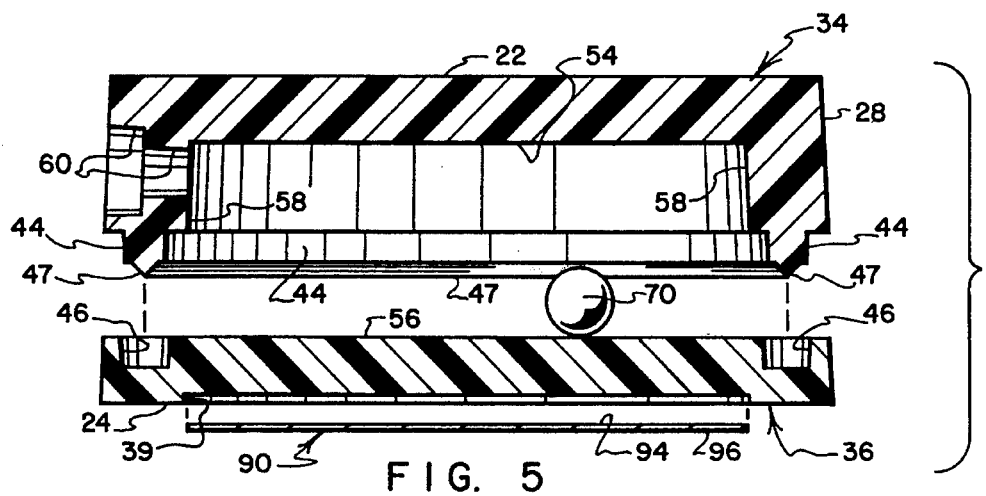
FIG. 5 is an exploded sectional view showing unassembled components of the marker.
Figure 8:
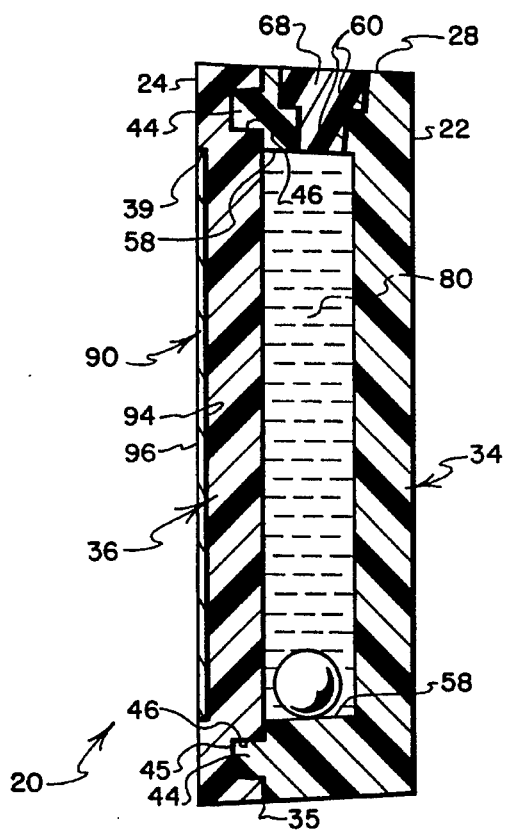
FIG. 8 is a sectional view similar to FIGS. 5–7 but showing components of the marker at the completion of assembly.
Figures 10, 11:
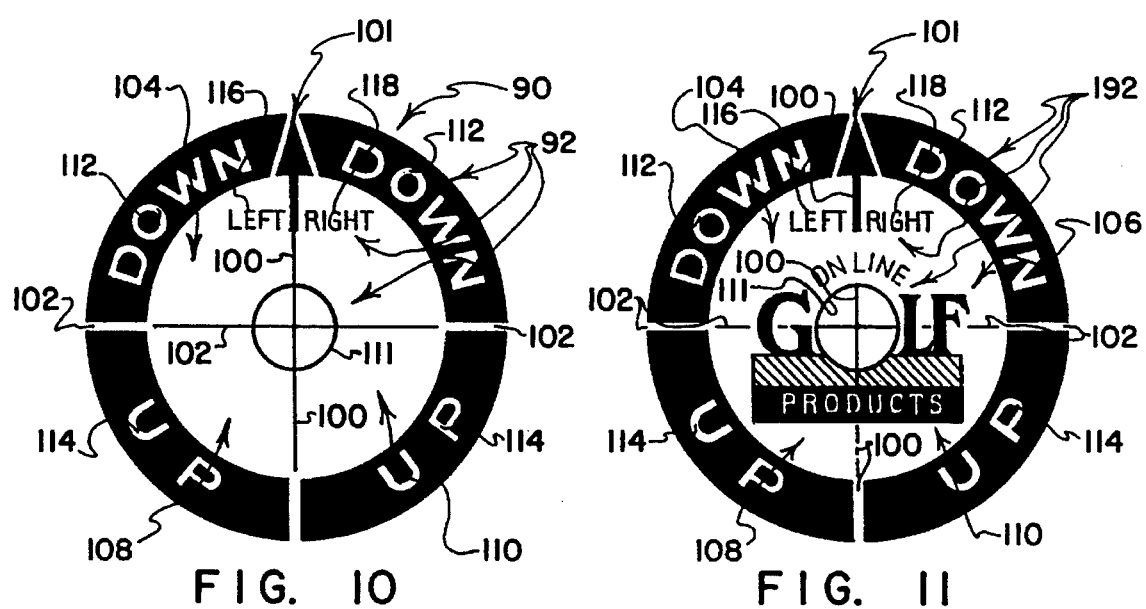
FIG. 10 is a top plan view showing indicia printed on a label of the marker; and, FIG. 11 is a top plan view similar to FIG. 10 but showing a modified form of indicia printed on a label of the marker.

Referring to FIGS. 4, 5 and 8, contained within the chamber 50 are a steel ball 70 and a sufficient quantity of oil 80 to fill the balance of the volume of the chamber 50. Adhered to the lower member 36 and positioned in a shallow recess 39 formed in the bottom surface 26, is a label 90. Referring to FIG. 10, the label 90 has indicia 92 printed on its top surface 94. As is best seen in FIGS. 1 and 2, the indicia 92 and the ball 70 are visible through the material of the body 22 and through the oil 80 to provide a "reading" that is indicative of the slope of a ground surface (not shown) on which the marker 20 is positioned. The manner in which the ball 70 and the indicia 92 of the label 90 cooperate to provide a "reading," and the manner in which the marker 20 is put to use, will be described in greater detail after other physical features of the components and construction of the marker 20 have been described.

Returning to a more detailed description of the features of the marker 20, attention first will be paid to the preferred shape of the body 22. While it will be understood that the top and bottom surfaces 24, 26 could be formed such that they are of equal diameter and are interconnected by a side surface 28 that is of true cylindrical form, preferred practice (which is what is illustrated in the drawings) calls for the top surface 24 to have a diameter that is slightly less than that of the bottom surface 26, and for the side surface 28 to be of a frusto-conical shape that features only a small taper. Likewise, while the planes of the top and bottom surfaces 24, 26 could be spaced apart by a value chosen from a wide range of options, preferred practice (which takes into consideration the desirability of providing the body 22 with a thin, stable, easy-to-grasp, disc-like shape) calls for the distance between the surfaces 24, 26 to be within the range of about twenty-four to about twenty-eight percent of the diameter of the bottom surface 26.

By way of example, if the top surface 24 is selected to be about 32 mm in diameter, the bottom surface 26 preferably is selected to have a diameter that is only about 1 mm larger, the space between the parallel planes of the top and bottom surfaces 24, 26 preferably is selected to be about 8.6 mm, and the corresponding taper of the side surface 28 that is needed to smoothly and directly connect the circumferences of the top and bottom surfaces 24, 26 is only about 3 degrees.

Referring to FIGS. 3 and 4, the upper body member 34 is of generally inverted-cup shape, while the lower body member 36 is of generally disc shape. Both of the members 34, 36 preferably are formed from a suitable plastic material such as a high molecular weight acrylic plastic resin that will provide a body 22 that is rigid and transparent, through which the ball 70 and the indicia 92 of the label 90 can be viewed with clarity and without appreciable distortion. The assembly of the upper and lower members 34, 36 preferably is carried out such that only a barely visible ring-like line of juncture 35 (see FIG. 3) can be seen extending around the side surface 28 of the assembled body 24.

While a suitable adhesive can be utilized to form the bond 45 that holds the upper and lower members 34, 36 in assembled relationship, in preferred practice the bond 45 is formed by utilizing conventional techniques of ultrasonic welding. Toward this end, a depending tip formation 47 (see FIGS. 5 and 6) is provided on the depending projection 44. After the members 34, 36 have been partially assembled in the manner that is illustrated in FIG. 6, the depending tip formation 47 is heated and softened sufficiently (by being subjected to ultrasonic energy in accordance with conventional techniques of ultrasonic welding that need not be described here inasmuch as they are well known to those who are skilled in the art), to permit the upper and lower members 34, 36 to be pressed together to their final assembled position, as depicted in FIG. 4. When the heat-softened material of the tip formation 47 cools, it forms the desired bond 45 which not only holds the members 34, 36 in assembled relationship, but also establishes a continuous seal between the members 34, 36 that extends about the chamber 50.

A preferred material used to form the members 32, 34 is a clear, high molecular weight acrylic plastic resin that is transparent, that permits objects to be viewed clearly therethrough, that is hard and scratch resistant, that exhibits good weather and chemical resistance, and that will withstand extensive exposure to sunlight without becoming yellow, clouding, cracking or exhibiting some other troublesome form of deterioration. Such resins are available from a wide variety of sources, for example resins sold under the product designators "PL-76" and "PL-150" by Plaskolite, Inc. of Columbus, Ohio 43216.

The steel ball 70 is selected to have a diameter that is only slightly less than the space between the parallel planes of the top and bottom walls 54, 56 of the chamber 50. If the spacing between the top and bottom walls 54, 56 is typically selected to be about 3.5 mm, the steel ball 70 preferably is selected to have a diameter of about 3.1 mm so that the ball 70 can move easily from side to side in the chamber 50 without noticeably appearing to "bounce" between the surfaces 54, 56. The ball 70 should be selected to be smooth and of high quality. In preferred practice, the ball 70 is a chrome plated steel ball that complies with the Anti-Friction Bearing Manufacturers Association (AFBMA) standard for "Grade 200," which designates a ball that has a basic diameter tolerance of plus or minus 0.001 inch, a sphericity of 0.0002 inch, and a maximum surface roughness of 8.0 microinches.

Referring to FIG. 7, the oil 80 is introduced into the chamber 50 (after the members 34, 36 have been assembled and bonded) by positioning the welded and bonded assembly of the members 34, 36 "on edge" so that the fill passage 60 is oriented to open upwardly. A small diameter conduit such as a hollow needle 82 is used to duct the oil 80 through the fill passage 60 without permitting the oil to touch the walls of the fill passage 60. Once the chamber 50 has been filled with oil 80, a plug 68 (typically formed by a drop or two of suitable adhesive) is bonded in place in the passage 60 to seal the oil 80 in the chamber 50. An outer end region 62 of the fill passage 62 is formed such that it has a slightly enlarged diameter (in comparison with the inner end region 64 of the fill passage 62) so that there will be adequate room in the passage to receive and seat a drop or two of adhesive to form the plug 68.

While oils of a variety of types can be used, the oil 80 should be selected to be clear or translucent in color; should not be of a petroleum base that will attack acrylic resin or such glue as is used to close the fill passage 60; should not be a material that will interfere with ultrasonic welding; should be environmentally friendly so as to do no damage to the environment; and should not be toxic or otherwise unsafe in the event that children or adults were to be exposed to it. A natural oil that meets these requirements, and that preferably is used to constitute the oil 80 is sunflower oil that has an MPA-S rating for liquid viscosity of about 63 at a temperature of twenty degrees Celsius.

A MPA-S rating for liquid viscosity of between about 55 to about 70 has been found, when used in combination with a steel ball 70 having a diameter of about 3.1 mm and with a chamber 50 having a height (i.e., the distance between the surfaces 54, 56) of about 3.5 mm to provide the desired characteristic of "slowing" movements of the ball 70 within the chamber 50, without unduly inhibiting such movements, so that the ball 70 will move relatively slowly from the center of the chamber 50 to one side of the chamber 50 when the marker 20 is placed on a gently inclined golf green, and so that the ball 70 will move relatively rapidly from the center of the chamber 50 to one side of the chamber 50 when the marker 20 is placed on a relatively steeply inclined golf green. Thus, by selecting the the oil 80 such that it has a viscosity that resides within a preferred range, the marker 20 is given the capability to provide an indication of the extent of inclination of a green on which the marker 20 is placed in that, the faster that the ball is observed to move from the center of the chamber 50 to one side of the chamber 50 as the marker is put in place on an inclined golf green, the steeper will be understood to be the slope of the green.

The label 90 preferably is formed as a decal that (together with the adhesive used to hold the label 90 in place) is resistant to and will remain in tact in the presence of water, oil and such chemicals as are likely to be sprayed onto a golf green (including pesticides, weed killers, fertilizer and the like) so that the label 90 (and its position-retaining adhesive) will not deteriorate when exposed to damp and/or chemically treated grass, or to the oil 80.

The label 90 has an upper surface 94 and a lower surface 96. While the indicia 92 is preferably printed on the upper surface 94 of a decal-type of label 90, as is depicted in FIG. 10, it will be understood by those who are skilled in the art that the indicia 92 may, instead, be directly printed onto a suitable surface of the body 22, for example on the bottom surface 26 of the lower body member 36, or on one of the surfaces 54, 56 that overlie and underlie the chamber 50. Likewise, while the label 90 is described as being adhered to the bottom surface 26, it will be understood that, instead, the label 90 may be adhered to another suitable surface of the body 22, for example the surface 56 that underlies the chamber 50.

Referring to FIG. 11, an alternative form of label 190 is shown to exemplify how a "logo" (or other printed matter, not shown) typically may be included on an upper surface of the label 190 without unduly interfering with desirable characteristics of the indicia 192 that are held in common with the indicia 92. The logo at the center of the label 190 in FIG. 11 is provided merely as an example of how a business name or other printed matter can be incorporated centrally among the indicia 92, 192, as will be readily understood by those who are skilled in the art.

Referring to FIGS. 10 and 11, important characteristics of the indicia 92 or 192 that is provided as a component part of the marker 20 preferably includes the following basic elements:

1) A pair of perpendicular lines 100, 102 that divide the circular chamber 50 into four equal quadrants that include a "Left Down" quadrant 104, a "Right Down" quadrant 106, a "Left Up" quadrant 108, and a "Right Up" quadrant 110, with an arrow 101 being provided at one end of the line 100 at the juncture of the ""Left Down" and the "Right Down" quadrants 104, 106;

2) A center circle 11 located in the center of the chamber 50 at the juncture of the intersecting lines 100, 102;

3) The word or words "DOWN" 112 placed so as to be associated with the "Left Down" and the "Right Down" quadrants 100, 102;

4) The word or words "UP" 114 placed so as to be associated with the "Left Up" and the "Right Up" quadrants 104, 106;

5) The word or words "Left" 116 placed so as to be associated with the "Left Down" and the "Left Up" quadrants 100, 104; and, 6) The word or words "Right" 118 placed so as to be associated with the "Right Down" and the "Right Up" quadrants 102, 106.

In preferred practice, the words "Down" and "Up" 112, 114 are situated in an outer ring 119 that extends about peripheral portions of the chamber 50, while the words "Left" and "Right" are placed on opposite sides of the line 102 at locations just inside the outer ring 119.

During a game of golf, the marker 20 typically is made use of to mark the position of a golf ball (not shown) when the golf ball is to be removed from a golf green during the putt of another player. The marker 20 first is oriented (while being held in one's hand) such that the arrow 101 points toward the hole toward which the golf ball is to be putted, and (while maintaining this orientation) is held substantially "level" while being lowered gently into initial engagement with the green so that, at the initiation of the contact of the marker 20 with the green, the ball 70 is substantially centered in the chamber 50 (i.e., the ball 70 is substantially centered in the circle 111 of the indicia 92) and the arrow 101 of the marker points toward the hole of the green.

After the marker 20 has made its initial contact with the golf green (while being held level and while being oriented in the manner just described), the marker 20 is released so that it then can drop in place atop an underlying portion of the golf green. As the marker is released, care is taken to observe and monitor the changing position of the ball 70 in the chamber 50—so that it will be noted whether the ball 70 moves from the center to one side of the chamber 50 slowly (indicating a gentle green slope), or rapidly (indicating a more substantial green slope). Once the ball 70 has come to rest at one side of the chamber 50. As a golfer gains experience in using the marker 20 in the manner just described, an understanding will be gained as to how the speed of movement of the ball 70 from the center to one side of the chamber 50 relates to the slope of the green, with increasingly faster movement indicating increasingly greater green slope.

Once the marker 20 has come to rest atop an underlying portion of a golf green, an observation is made as to whether the ball 70 is in the "Left Down," "Right Down," "Left Up" or "Right Up" quadrants 104, 106, 108, 110—to indicate whether the green breaks "Down and to the Left," "Down and to the Right," "Up and to the Left" or "Up and to the Right," respectively. Making these observations through use of the marker 20 helps to register important information in the mind of the golfer—information that needs to be taken carefully into account in putting so that the ball can be putted skill-fully, using a minimum number of strokes, toward and into the hole of the green.

Figure 9:
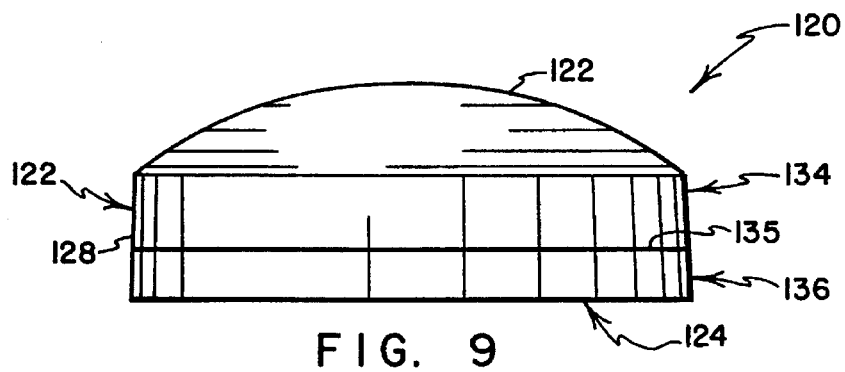
FIG. 9 is a front elevational view similar to FIG. 3 but showing a modified form of golf ball position marker.

An alternative embodiment of the marker 20 is indicated by the numeral 120 in FIG. 9. In FIG. 9, reference numerals are utilized to indicate features of the marker 120, with each of these numerals differing by a magnitude of one hundred from corresponding numerals that are used in FIG. 3 to indicate corresponding features of the marker 20. The only actual difference between the markers 20, 120 is that the top surface 24 of the marker 20 is flat, while the marker 120 has a top surface 124 that is convex—whereby the marker 120 has an upper member 134 that will serve as a magnifying lens to enlarge the appearance of the ball and indicia (not shown) of the marker 120. Such enlargement may assist in rendering the marker 120 more acceptable than is the marker 20 for use by at least some visually impaired persons.

While such terms as "horizontally extending," "front," "rear," "forwardly facing," "rearwardly facing," "left," "right" and the like are utilized herein, it will be understood that such terms are used merely to aid the reader in referring to features in the orientations in which they are depicted in the accompanying drawings, and are not to be construed as limiting the scope of the claims that follow.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty exist in the invention.

What is claimed is:

1. A golf ball position marker and golf green slope indicator, comprising:

a) structural means 1) for defining a body having opposed top and bottom exterior surfaces that are connected by a peripherally extending exterior surface, 2) for defining a chamber located within the interior of the body that is bordered by spaced upper and lower interior surfaces that are connected by a peripherally extending interior surface, and 3) for defining transparent means for extending between and defining the top and bottom exterior surfaces so that the content of the chamber and the rear exterior surface can be viewed through the front exterior surface;

b) spherical means for defining a single ball that is contained within the chamber and that is movable without obstruction throughout the chamber;

c) liquid means including a quantity of oil for cooperating with the ball to substantially fill the volume of the chamber, and for providing a viscosity that is selected to slow gravity-responsive movement of the ball within the chamber without significantly inhibiting such movement; and, d) indicia means connected to the body at a location that permits the indicia means to be viewed through the top exterior surface together with the ball, and for cooperating with the position of the ball to provide an indication of the slope of a putting green surface atop which the bottom exterior surface is positioned.

2. The golf ball position marker of claim 1 wherein the chamber is circular, and the indicia means includes:

a) first and second perpendicular lines that each extend at least part way across the circular chamber and that cooperate to divide the circular chamber into four equal quadrants that include a "Left Down" quadrant, a "Right Down" quadrant, a "Left Up" quadrant, and a "Right Up" quadrant, with an arrow being provided at one end of the first line at the juncture of the ""Left Down" and the "Right Down" quadrants;

b) a center circle mark located in close proximity to and surrounding the center of the circular chamber;

c) The word "Down" placed so as to be associated with the "Left Down" and the "Right Down" quadrants;

d) The word "Up" placed so as to be associated with the "Left Up" and the "Right Up" quadrants;

e) The word "Left" placed so as to be associated with the "Left Down" and the "Left Up" quadrants; and, f) The word "Right" placed so as to be associated with the "Right Down" and the "Right Up" quadrants.

3. The golf ball position marker of claim 1 wherein the steel ball is chrome plated and is selected to be smooth and of high quality, in compliance with the Anti-Friction Bearing Manufacturers Association (AFBMA) standard for a "Grade 200" ball.

4. The golf ball position marker of claim 1 wherein the oil comprises Sunflower oil that is selected to exhibit a MPA-S rating of between about 55 and about 70 for viscosity at a temperature of about twenty degrees Celsius.

5. The golf ball position marker of claim 1 wherein the body is formed from acrylic plastic resin that is selected to be transparent, that permits objects to be viewed clearly therethrough, that is hard and scratch resistant, that exhibits good weather and chemical resistance, and that will withstand exposure to sunlight without exhibiting undue deterioration.

6. The golf ball position marker of claim 1 wherein the body is formed from an upper member and a lower member that are bonded together, and that cooperatively define the chamber within which the ball and the quantity of oil are contained.

7. The golf ball position marker of claim 6 wherein the upper member and the lower member have interfitting annular formations that extend about the periphery of the chamber and that are connected by a substantially continuous bond that also extends about the chamber to form a seal between the upper and lower members.

8. The golf ball position marker of claim 7 wherein the substantially continuous bond is formed by utilizing conventional techniques of ultrasonic welding.

9. The golf ball position marker of claim 1 wherein the marker additionally includes a label that is connected to the body, and the indicia means is printed on the label.

10. The golf ball position marker of claim 9 wherein the label has opposed top and bottom label surfaces, the indicia means is printed on the top label surface, and the top label surface is adhered to the bottom exterior surface of the body.

11. A combination golf ball position marker and golf green slope indicator, comprising:

a) a generally circular body formed as a bonded assembly of an injection molded upper member and an injection molded lower member, with each of the upper and lower members being formed from substantially transparent plastic material, with the assembled upper and lower members cooperating to define an interior chamber that is bordered by spaced, parallel extending upper and lower interior surfaces that are connected by a peripherally extending interior surface, with the upper member defining a top exterior surface of the body, with the lower member defining a bottom exterior surface of the body, with the top and bottom exterior surfaces of the assembled upper and lower members being generally circular and having their circumferences joined by a circumferentially extending exterior surface that is defined, at least in part, by contiguously extending portions of each of the upper and lower members, and with the transparent plastic material from which the upper and lower members are formed permitting contents of the chamber and the bottom exterior surface to be viewed through the top exterior surface;

b) a spherical, chrome plated, steel ball contained within the chamber and being movable without obstruction throughout the chamber;

c) a quantity of oil that cooperates with the ball to substantially fill the volume of the chamber, and that has a viscosity that is selected to slow gravity-responsive movement of the ball within the chamber without significantly inhibiting such movement; and, d) indicia means connected to the bottom exterior surface for being viewed through the top exterior surface together with the ball, and for cooperating with the position of the ball to provide an indication of the slope of a putting green surface atop which the bottom surface is positioned.

12. The golf ball position marker of claim 11 wherein the top exterior surface is convex and cooperates with the upper interior face and with portions of the upper member to define lens means for magnifying the appearance of the ball and the indicia as viewed through the top exterior surface.

13. The golf ball position marker of claim 11 wherein the chamber is circular, and the indicia means includes:

a) first and second perpendicular lines that each extend at least part way across the circular chamber and that cooperate to divide the circular chamber into four equal quadrants that include a "Left Down" quadrant, a "Right Down" quadrant, a "Left Up" quadrant, and a "Right Up" quadrant, with an arrow being provided at one end of the first line at the juncture of the ""Left Down" and the "Right Down" quadrants;

b) a center circle mark located in close proximity to and surrounding the center of the circular chamber;

c) The word "Down" placed so as to be associated with the "Left Down" and the "Right Down" quadrants;

d) The word "Up" placed so as to be associated with the "Left Up" and the "Right Up" quadrants;

e) The word "Left" placed so as to be associated with the "Left Down" and the "Left Up" quadrants; and, f) The word "Right" placed so as to be associated with the "Right Down" and the "Right Up" quadrants.

14. The golf ball position marker of claim 11 wherein the oil comprises Sunflower oil.

15. The golf ball position marker of claim 11 wherein the upper member and the lower member have interfitting annular formations that extend about the periphery of the chamber and that are connected by a substantially continuous bond that also extends about the chamber to form a seal between the upper and lower members.

16. The golf ball position marker of claim 15 wherein the substantially continuous bond is formed by utilizing conventional techniques of ultrasonic welding.

17. The golf ball position marker of claim 11 wherein the upper member has a depending annular wall portion that defines the peripherally extending interior surface and a major portion of the circumferentially extending exterior surface, a fill passage is formed through the depending annular wall having one end region that opens through the peripherally extending interior surface and an opposite end region that opens through the circumferentially extending exterior surface, with a plug being inserted into the fill passage to seal the fill passage after said quantity of oil has been introduced through the fill passage into the chamber.

18. The golf ball position marker of claim 11 wherein the circumferentially extending exterior surface is of frustoconical shape and is opaque.

19. The golf ball position marker of claim 11 wherein the marker additionally includes a thin, opaque disc of material that is connected to the bottom surface of the body to underlie substantially the entire area of the chamber.

20. The golf ball position marker of claim 19 wherein the thin, opaque disc of material is a label that has opposed top and bottom label surfaces, the indicia means is printed on the top label surface, and the top label surface is adhered to the bottom exterior surface of the body.

* * * * *